May 5, 1970  HARUHISA FURUISHI ET AL  3,510,746
TRANSISTOR CONTROLLED BATTERY CHARGER
Filed June 2, 1967  10 Sheets-Sheet 1
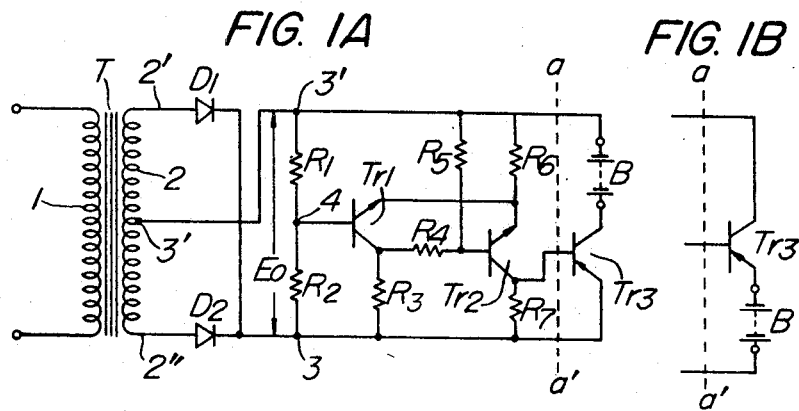
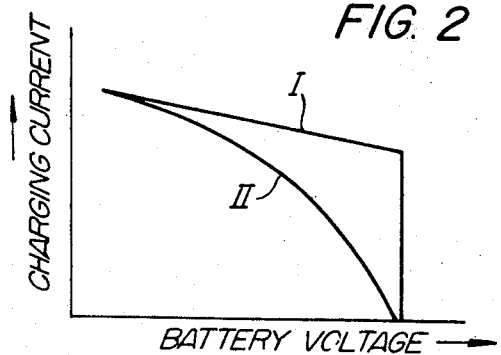
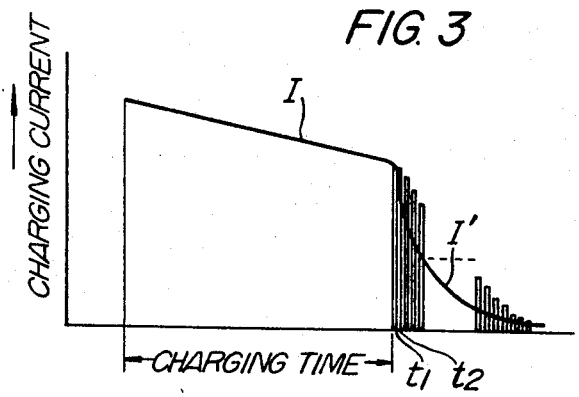

PRIOR ART FIG. 4
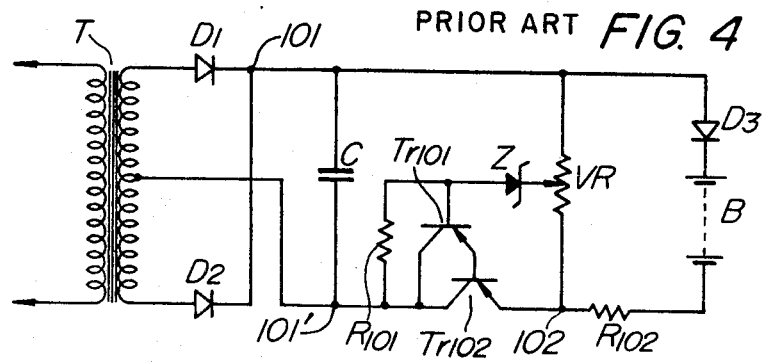
FIG. 5
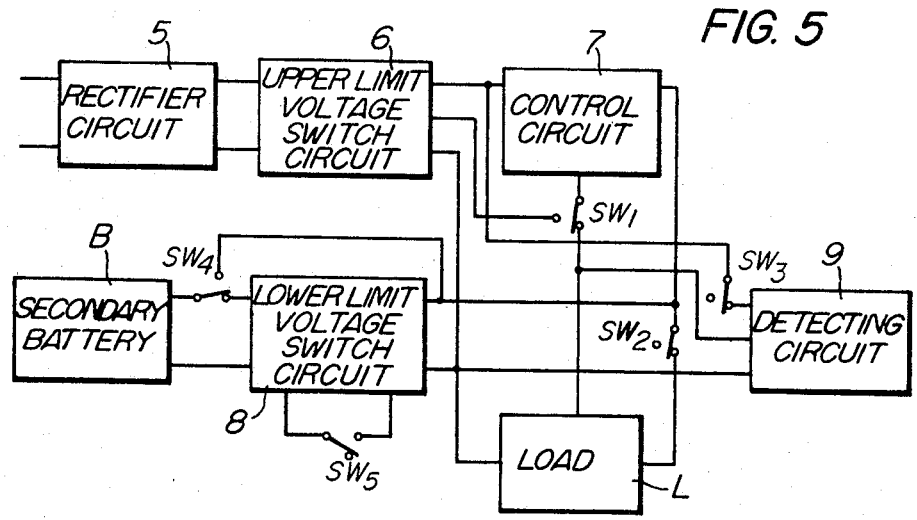

United States Patent Office 3,510,746
Patented May 5, 1970

3,510,746
TRANSISTOR CONTROLLED BATTERY CHARGER
Haruhisa Furuishi, Suita-shi, Katsuaki Kawamoto, Yamatokoriyama-shi, and Yoneji Koyama, Osaka, Japan, assignors to Matsushita Electric Industrial Co., Ltd., Osaka, Japan, a corporation of Japan
Filed June 2, 1967, Ser. No. 643,118
Claims priority, application Japan, June 9, 1966 (utility model), 41/54,882; Aug. 17, 1966, 41/54,559, 41/54,560
Int. Cl. H02j 7/04
U.S. Cl. 320—39          9 Claims

ABSTRACT OF THE DISCLOSURE

Two transistors are used to form a jumping switch circuit or a modified jumping switch circuit, of which the preceding transistor base is connected with the connection point of dividing resistors connected with the output terminal of a rectifier circuit. The jumping or modified jumping switch circuit also has its output terminal connected with a transistor connected with a secondary battery, which is initially charged at a heavy current. At a point of time when the charge completing voltage is approached, a small current is imparted to the secondary battery in a form of joggling so as not to generate gas, whereby the battery is shifted into a completely charged state while restraining the gas generation.

---

This invention relates to a battery charger for charging a secondary battery such as an alkaline manganese secondary battery, an enclosed or semienclosed type lead storage battery or Ni-Cd battery, and more particularly to a transistorized battery charger in which the charging current is decreased at the charge completing time to thereby prevent any overcharge of the battery.

In the secondary battery such as an enclosed or semienclosed type lead storage battery or Ni-Cd battery, there is a possibility that gas is generated toward the termination of charging resulting in various inconveniences such as reduced electrolyte, insufficient charge, explosion and the like which would lead to the deterioration of the battery. According to the present invention, as described later, additional chargings are effected in a form of joggling at the termination of charging with the battery voltage set at a potential lower than the level at which gas is generaed, thereby preventing not only any overcharge but also any deterioration of the battery due to said various inconveniences so as to enable efficient charging to be carried out.

In the past the constant-voltage charging system was employed as the method of charging a secondary battery while preventing its overcharge. However, the electrical circuit using such known system show a tapered charging characteristic as shown by the curve II in FIG. 2 of the accompanying drawings illustrating the performance characteristics of the circuit, and there was a disadvantage that the charging current decreases with the rise of the battery voltage, which leads to a longer charging ime as well as insufficient charge. Furthermore, the repeated additional charging operation caused the internal resistance of the battery to be increased, which led to a higher voltage at the termination of charging and consequently to a greater tendency for said insufficient charge. Still furthermore, the use of constant-voltage diodes in the circuit increased the cost of manufacture. Moreover, it is very difficult to form a constant-voltage means at a low voltage such as 3 volts or less since the characteristic of the constant-voltage diode suffers from great non-uniformity at a low voltage, and in fact, no battery charger has been made which can prevent the overcharge of a battery of a low voltage corresponding to one or two volts.

Accordingly it is the primary object of the present invention to provide an improved battery charger in which such drawbacks existing in the conventional battery charger are eliminated and which can be satisfactorily used even at low voltages and manufactured from economically.

The above and other objects and advantages of the present invention will become more apparent from the following detailed description made in conjunction with the accompanying drawings showing various forms of the invention, wherein:

FIG. 1A is a diagram showing an electric circuit in the transistor controlled battery charger according to an embodiment of the present invention;

FIG. 1B is a diagram showing a modified circuit in the right-hand portion from line a–a' as shown in FIG. 1A;

FIG. 2 is a graph illustrating the performance characteristics of the battery charger according to the present invention and the conventional constant-voltage battery charger;

FIG. 3 is a graph illustrating the charging condition and showing the relation between the charging current and time of the present device;

FIG. 4 is a diagram of the electric circuit in the conventional constant-voltage battery charger;

FIG. 5 is a block diagram showing a transistor controlled battery charger according to another example of the present invention provided with a non-return type overdischarge preventing circuit;

Figure 6:
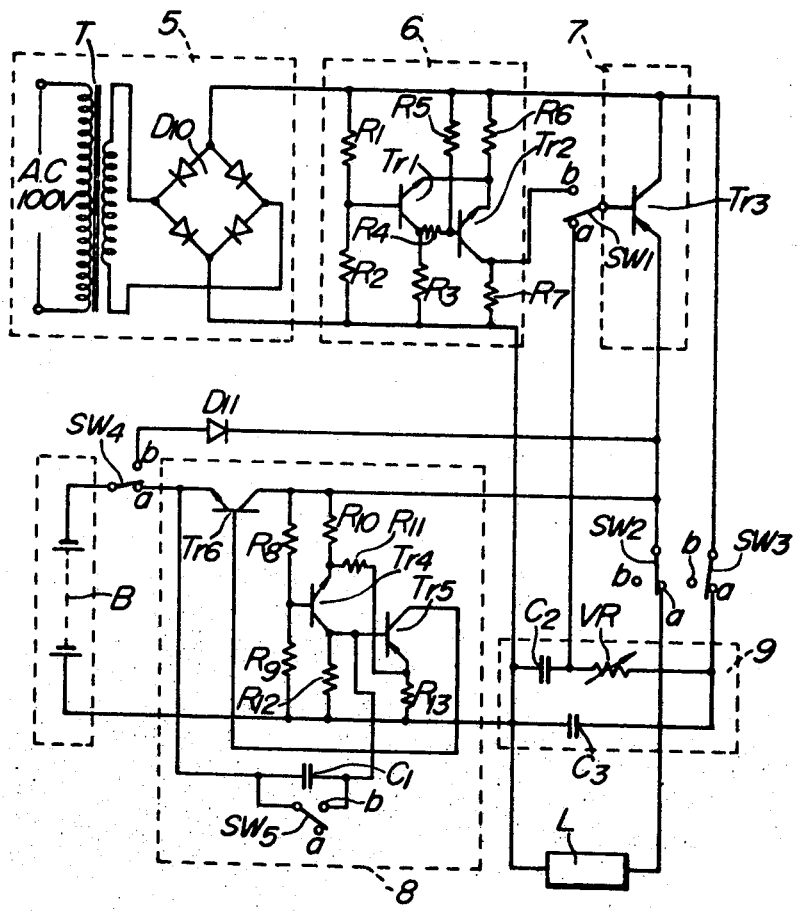
FIG. 6 shows an electric circuit in the transistor controlled battery charger as shown in FIG. 5.

Referring now to FIG. 1A, a transformer T includes a primary winding 1 having the ends thereof connected with an A.C. power source. Said transformer T also includes a secondary winding 2 having upper and lower terminals 2' and 2" connected with diodes $D_1$ and $D_2$ respectively, so that a D.C. power is obtained by effecting a full-wave rectification. Said two terminals 2' and 2" are connected with each other behind the respective diodes $D_1$ and $D_2$ connected thereto and this connection between the terminals 2' and 2" forms one of output terminals 3. The other of output terminals 3 has its end 3' connected with the center of the secondary winding 2. Across these output terminals 3 there is connected a series connection of resistors $R_1$ and $R_2$. A D.C. voltage $E_0$ applied between said resistors $R_1$ and $R_2$ is passed to the input terminal of a Schmitt circuit formed by five resistors $R_3$ to $R_7$, and by two NPN type transistors $Tr_1$ and $Tr_2$ having their emitters connected with each other.

The preceding transistor $Tr_1$ in a jumping switch circuit has its base connected with the connection point 4 of the resistors $R_1$ and $R_2$. Said connection point 4 is used as the voltage detecting portion. Further, the transistor $Tr_2$ in the jumping switch circuit has its output terminal connected with the base of a PNP type transistor $Tr_3$ which forms a current amplifier circuit. The letter B indicates a secondary battery such as a storage battery or the like to be charged which is connected with the collector of said transistor $Tr_3$. In FIG. 1B, the secondary battery B is connected with the emitter or output terminal of the transistor $Tr_3$ but the connections leftward of dotted line $a$–$a'$ are entirely similar to those in FIG. 1A. The circuit operation is the same in FIGS. 1A and 1B and therefore it will be described with reference to FIG. 1A.

Assuming that the base voltage of transistor $Tr_1$ is $V_B$, the emitter voltage $V_E$, and the operating voltage $Vbe$, and if the relation therebetween is:

$$V_B - V_E > Vbe \quad (1)$$

then the transistor $Tr_1$ is in the "ON" state and transistors $Tr_2$ and $Tr_3$ are in the "OFF" state. If the relation is $$V_B - V_E < Vbe \quad (2)$$

then the transistor $Tr_1$ assumes the "OFF" state while the transistors $Tr_2$ and $Tr_3$ assume the "ON" state. The ratio of resistors $R_1$ and $R_2$ is determined such that the foregoing Equation 1 is satisfied when the voltage of the secondary battery B charged by utilizing such operation of the transistors comes close to the voltage value at which the charging is completed, and thereby the transistor $Tr_1$ is rendered conductive while the transistors $Tr_2$ and $Tr_3$ are rendered nonconductive so as to prevent the secondary battery B from being overcharged.

At the same time, by utilizing the hysteresis effect which is provided by the Schmitt circuit, namely, the relation of V "ON" < V "OFF" in the operating voltage of the jumping switch circuit, the supplemental charging at the end of the charging time is effected in a form of joggling so as to increase the charging efficiency.

With respect to a lead storage battery and a Ni-Cd battery, the approximate values of the gas generating voltage and the charge completing voltage are as shown in the following table, in which the charging time is 10 to 20 hours for the lead storage battery and 5 hours for the Ni-Cd battery.

| Voltage | Secondary battery | |
|---|---|---|
| | Lead storage battery. | Ni-Cd battery. |
| Gas generating voltage (v.) | 2.3–2.5 | Approx. 1.55 |
| Charge completing voltage (v.) | 2.65–2.8 | Approx. 1.7 |

Each voltage is that per cell.

In the transistor controlled battery charger according to the present invention, the ratio of the resistors $R_1$ and $R_2$ are determined such that the set voltage of the Schmitt circuit which turns on the transistor $Tr_1$ is selected in the vicinity of the gas generating voltage given in the above table.

An example of the set voltage in the present device is shown as follows:

| | Set voltage (v.) | Type of secondary battery |
|---|---|---|
| Lead storage battery | 14.5 | Semienclosed type 12 v. 4 AH. |
| Ni-Cd battery | 15.0 | Enclosed type 12.5 v. 225 mAH. |

Description will now be made briefly of an example of the conventional constant-voltage charging system with reference to FIG. 4. The latter T represents a power transformer and $D_1$ and $D_2$ are diodes which are respectively connected at one end with the two terminals of the secondary winding of said transformer T. $D_1$ and $D_2$ are connected together at the other end thereof to form a positive terminal 101 of a D.C. output so that a D.C. output can be taken out with the center of the secondary winding of the transformer T serving as the negative terminal 101 of the D.C. output. A smoothing capacitor C is connected between the terminals 101 and 101'. $R_{101}$ and $R_{102}$ are fixed resistors and Z is a constant-voltage diode which is connected between the base of transistor $Tr_{101}$ and the movable terminal of variable resistor VR. $D_3$ is a reverse-current preventing diode and B represents a secondary battery. The secondary battery B is connected with the fixed terminal of the variable resistor VR through diode $D_3$ and resistor $R_{102}$ so that the constant-voltage diode Z detects a potential corresponding to the voltage drop of the battery and resistor $R_{102}$. $Tr_{101}$ and $Tr_{102}$ are control transistors connected in Darlington fashion and adapted to control the connection between the termnial 101 and the connecting point 102 of the resistor $R_{102}$ with the variable resistor VR at a constant potential determined by the diode Z. Accordingly, when an A.C. input is applied from the transformer T and thereby a charging current starts to flow into the secondary battery B, the connection between the terminals 101 and 102 is maintained at a constant voltage at all times, and consequently, when the battery voltage rises as the charging progresses, the charging current drops in a tapered form as shown by the curve II in FIG. 2.

The actual operation of the battery charger according to the present invention will be apparent from the following description.

FIG. 2 illustrates the relation between the batery voltage and the charging current, wherein the letter I represents the characteristic curve of the battery charger according to the present invention and the letter II represents that of the above-described conventional constant-voltage battery charger. As will be apparent from this figure, according to the conventional constant-voltage battery charger, the battery voltage gradually rises as the charging progresses, while the charging current decreases with the progress of the charging to take a tapered form in which the charging current becomes zero when the charge completing voltage is reached. In contrast, in the battery charger according to the present invention, the transistor $Tr_1$ maintains the "OFF" state and transistors $Tr_2$ and $Tr_3$ the "ON" state during the time from the initiation till the termination of the charging, in other words, until the transistor $Tr_1$ is turned on and transistors $Tr_2$ and $Tr_3$ are turned off, whereby a substantially uniform and great charging current is passed to thereby increase the quantity of charge per unit time, which means a shortened charging time. Table 1 below shows by comparison the quantity of charge attained by the battery charger of the present invention and that attained by the constant-voltage battery charger of the known type, for a predetermined period of time.

TABLE 1

| Charging system | Quantity of charge after lapse of 10 hrs. (AH) | Percentage |
|---|---|---|
| Battery charger of this invention | 3.8 | Approx. 100 |
| Constant-voltage battery charger of conventional type | 3.2 | Approx. 84 |

Conditions:
  Secondary battery—Approx. 4 AH battery.
  Battery voltage—12 v.
  Set voltage for charge completion—14.5 v.
  Charging time—10 hrs.
  Temperature—25° C.

The relation between the charging time and the charging current will now be described. Referring to FIG. 3, the transistor $Tr_1$ is in the "OFF" state and transistors $Tr_2$ and $Tr_3$ are in the "ON" state, as described above, during the time $t$ from the initiation of charging till the battery voltage reaches the charge completing voltage, whereby a substantially uniform and great current is passed. However, the charging current becomes zero when the battery voltage approaches the charge completing voltage, namely when transistor $Tr_1$ assumes the "ON" state and transistor $Tr_2$ and $Tr_3$ the "OFF" state, since the set voltage of the Schmitt circuit is selected in the vicinity of the gas generating voltage. Under such condition no more charging can be effected. However, after the charging current is cut off, the battery voltage gradually drops and, after lapse of a time $t_1$, it reaches the "ON" voltage (V "ON"<"OFF") as the result of the hysteresis effect provided by the Schmitt cricuit. Therefore the jumping switch circuit resumes its operation to cause the secondary battery to be charged again. After a time $t_2$ elapses from the initiation of said second charging, the battery voltage again rises to render the transistor $Tr_1$ conductive and transistors $Tr_2$ and $Tr_3$ nonconductive so that the charging current is cut off. When a predetermined time elapses after this break of the charging current, the battery voltage again drops down to the "ON" voltage (V "ON"<V "OFF") whereby the jumping switch circuit again operates for a predetermined time to effect charging. In this way, the battery voltage drops again and again after the first charging is effected, whereby the jumping switch circuit repeats its operation to effect additional chargings.

The value of a joggling current consumed in such additional charging gradually decreases to prevent any overcharge while it is further charging the battery. In FIG. 3, the letter I represents the value of the current during the initial charging and I' is the average value of the charging current during the charging by the joggling current. Generally, in the case of charging of an enclosed or semi-enclosed type secondary battery, there is produced little or no gas during a portion of the charging time preceding the gas generation, namely until 80 to 90% of the complete charge is reached, and therefore it is possible to effect charging by flowing a heavy current as the charging current. However, it has been found that if the charging is continued by using the heavy current still after 80 to 90% of the complete charge is reached, a gas is generated which often results in damaged performance of the battery. Such drawback is overcome in the battery charger of the present invention, in which, after 80 to 90% of the complete charge is reached or after the transistor $Tr_1$ assumes its initial "ON" state, the joggling current is passed in a predetermined quantity at predetermined time intervals to repeat the additional charging in a form of joggling thereby restraining any gas from generating and achieving a complete charging without causing any overcharge.

Consequently, the battery charger according to the present invention can provide an improved charging efficiency over the prior art and thereby reduce the charging time, and also any overcharge can be prevented by transistors $Tr_1$, $Tr_2$ and $Tr_3$. Moreover, the jumping switch circuit in the battery charger of this invention comprises two transistors instead of using any constant-voltage diode, and this leads to the more economy in the manufacture thereof.

Figure 7:
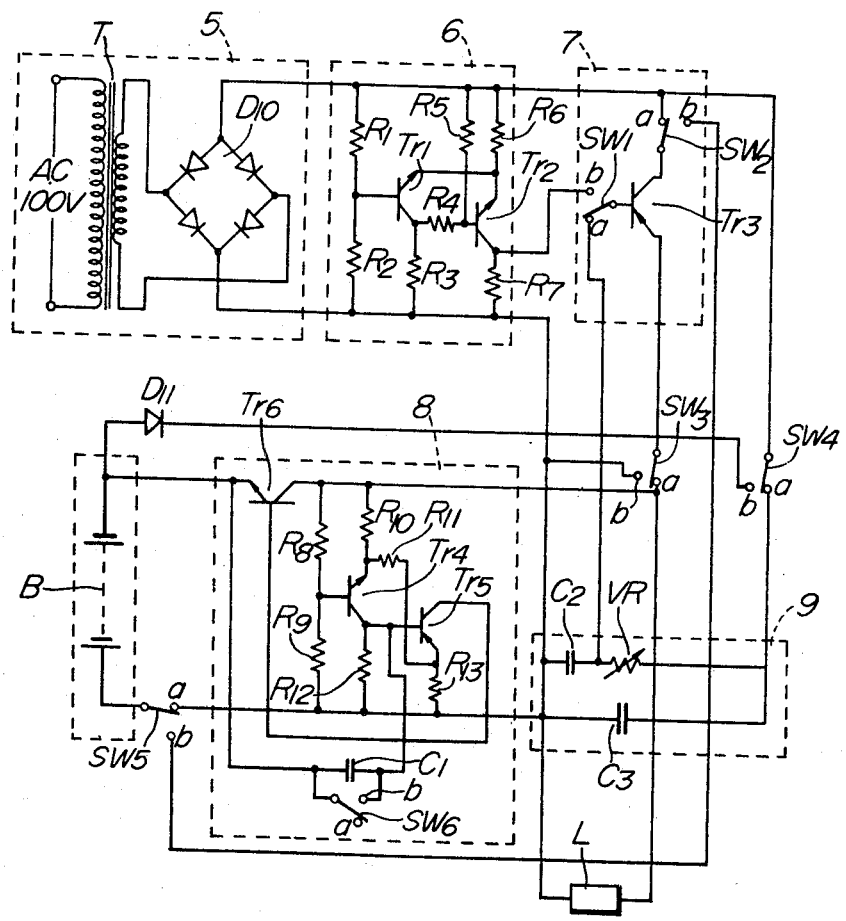
FIG. 7 is a diagram showing a modified form of the electric circuit illustrated in FIG. 6.
Figure 8:
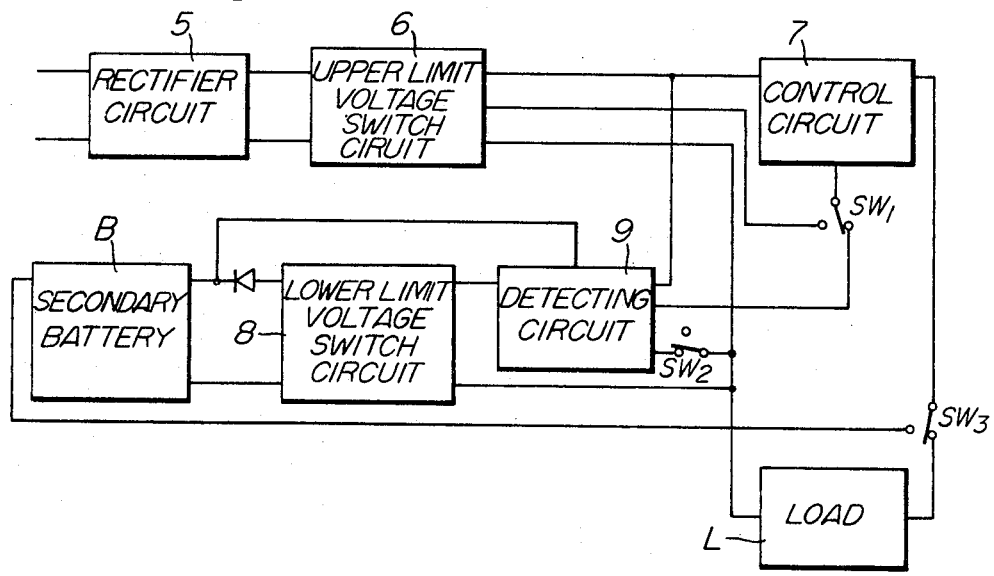
FIG. 8 is a block diagram showing an automatic charging device according to still another embodiment of the present invention provided with an automatic return type overdischarge preventing circuit.
Figure 9:
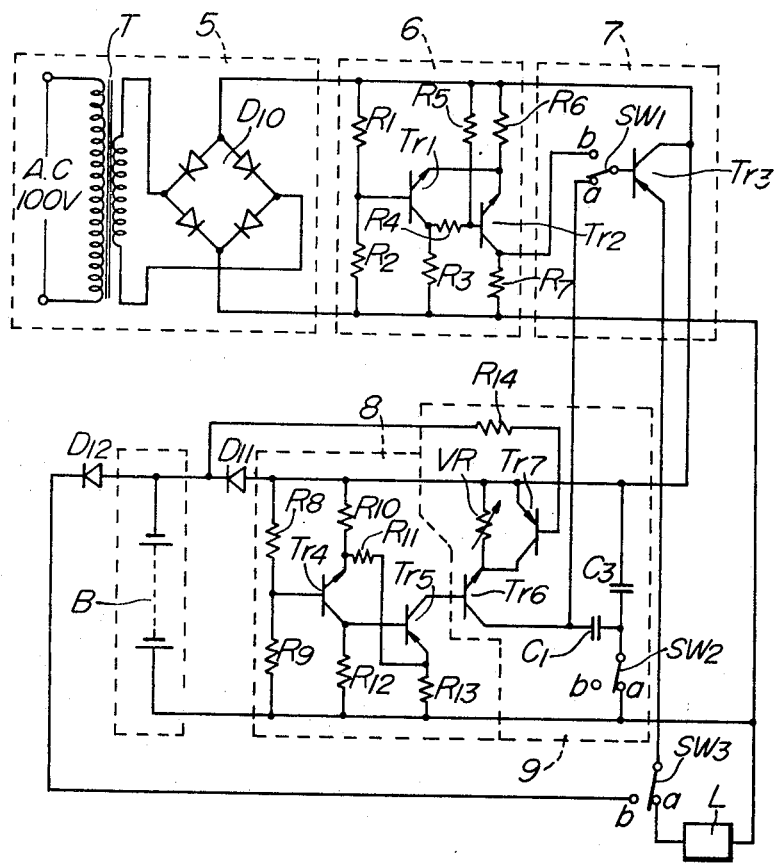
FIG. 9 shows an electric circuit in the transistor controlled battery charger as illustrated in FIG. 8.
Figure 10:
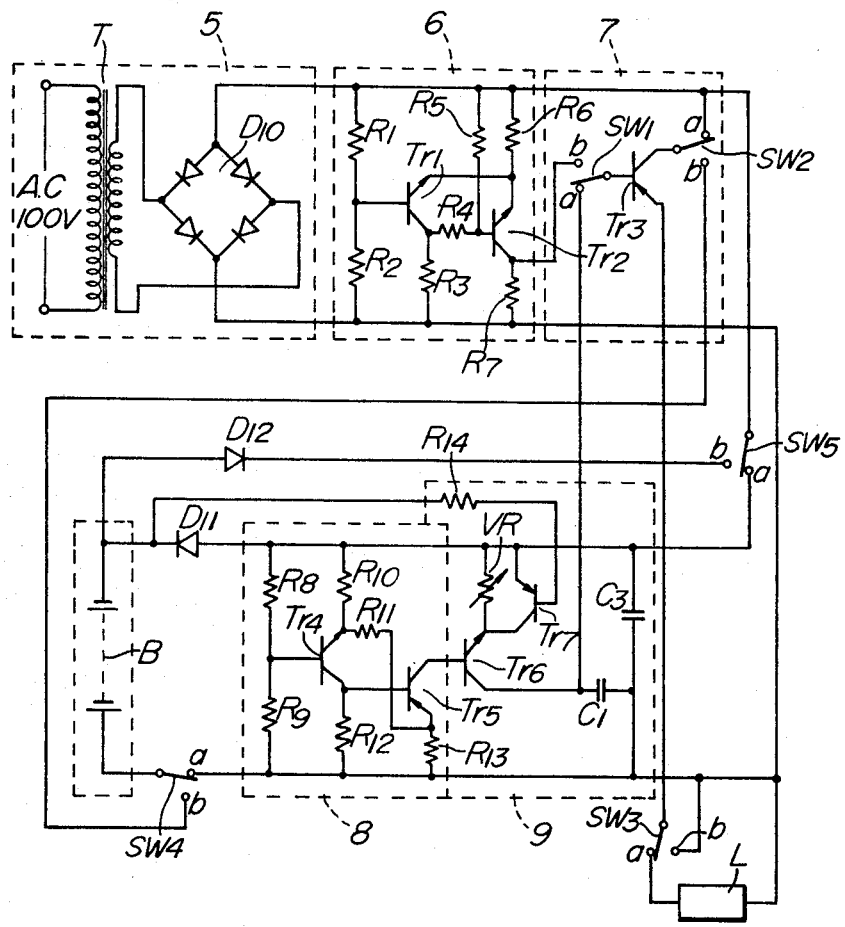
FIG. 10 is a diagram showing a modified form of the electric circuit illustrated in FIG. 9.

Referring now to FIGS. 5 to 10, there are shown examples of the application of the transistor controlled battery charger of this invention to a power source means. FIG. 5 is a block diagram showing one of such examples and FIG. 6 shows the electrical circuit thereof. FIG. 7 shows a partially modified form of the circuit diagram of FIG. 6. FIG. 8 illustrates a block diagram in another form of application and FIG. 9 is the electrical circuit diagram thereof. A partially modified form of the FIG. 9 circuit is shown in FIG. 10. These applications relate to power source means for supplying a D.C. current to a transistorized television or other load.

In these applications there is provided a power source means having a transistor controlled battery charger, which comprises, in combination, a secondary battery, a rectifier circuit connected with a commercially available power source, an automatic return type upper limit switch circuit, an automatic return type lower limit switch circuit or a nonreturn type lower limit switch circuit, a detecting circuit, a control circuit, and single pole double throw interlocking switches. When power is supplied to a load from the commercial power source, the charging circuit for the secondary battery is disconnected while the surge absorbing characteristic is maintained. When the commercial power source is disconnected, power is supplied to the load from the second battery while preventing the latter from being overdischarged, and charging is effected in a form of joggling by the commercial power source without overcharging the secondary battery such as a storage battery when the load circuit is disconnected.

Some examples of the application of the present invention will be described with reference to FIGS. 5 to 8. In the block diagram of FIG. 5 showing a power source means provided with a nonreturn type lower limit switch circuit, there are included a rectifier circuit 5 connected with a commercial power source, an automatic return type upper limit switch circuit 6, a control circuit 7, a nonreturn type lower limit voltage switch circuit 8, a detecting circuit 9, a secondary battery B such as a storage battery, and a load L. When power is supplied to the load L, a parallel circuit comprising the rectifier circuit 5, the upper limit switch circuit 6 and the detecting circuit 9 is connected with a parallel circuit comprising the secondary battery B, the lower limit switch circuit 8 and the load L through the control circuit 7 on the negative side. When the secondary battery B is charged, a series circuit comprising the battery B and the control circuit 7 is connected in parallel with a parallel circuit comprising the rectifier circuit 5 and the upper limit switch circuit 6. $SW_1$ to $SW_5$ are interlocking switches.

The arrangement of FIG. 5 is illustrated in greater detail in FIG. 6. T is a transformer and $D_{10}$ is a rectifier circuit consisting of bridge-connected diodes. The automatic return type upper limit switch circuit 6 comprises a Schmitt circuit formed by two transistors of the same conduction type such as NPN transistors $Tr_1$ and $Tr_2$ having their emitters connected together, the preceding transistor $Tr_1$ having its base connected with a connection point of dividing resistors $R_1$ and $R_2$ connected in parallel with the rectifier circuit 5. The control circuit 7 employs a PNP transistor $Tr_3$ which has its collector connected with the negative side of said rectifier circuit 5 and its base connected with the collector of the transistor $Tr_2$ through the contact b of the switch $SW_1$.

The nonreturn type lower limit switch circuit comprises a modified Schmitt circuit formed by two transistors of opposite conduction type such as NPN transistor $Tr_4$ and PNP transistor $Tr_5$ having their emitter connected together through a resistor $R_{11}$, the preceding transistor $Tr_4$ having its base connected with the connection point of resistors $R_8$ and $R_9$, and an NPN transistor $Tr_6$ having its base connected with the collector of the transistor $Tr_5$, the emitter and collector of said transistor $Tr_6$ being connected with the negative side of the battery B and one end of said resistor $R_8$ respectively. $C_1$ is a starting capacitor. The detecting circuit 9 comprises a capacitor $C_2$ and a variable resistor VR connected together in series, which are connected in parallel with the rectifier circuit 5 through the contact a of the switch $SW_3$. The base of transistor $Tr_3$ is connected with the connection point between a capacitor $C_2$ and a variable resistor VR through the contact a of the switch $SW_1$. $C_3$ is a smoothing capacitor. The load L is connected in parallel with the rectifier circuit 5 through the contact a of the switch $SW_2$ and the emitter and collector of the transistor $Tr_3$, and also connected in parallel with lower limit switch circuit 8 and the battery B. $D_{11}$ is a reverse current preventing diode inserted between the emitter of transistor $Tr_3$ and the negative pole of battery B. Switches $SW_1$ to $SW_5$ are associated with each other so as to be simultaneously switched to either the contact a side or the contact b side.

In operation, if the switches $SW_1$ to $SW_5$ are switched to their contact $b$ side, the circuit to the load L is disconnected by the switch $SW_2$ to thereby form the charging circuit for the battery B. In this case, similarly to FIG. 1B, the arrangement is entirely the same as in FIG. 1A except that a diode $D_{11}$ is inserted between the battery B and the emitter of the transistor $Tr_3$. If an A.C. input is applied from the transformer T, the battery B is charged in a pulsed manner without being overcharged, as described with respect to FIG. 1A. Therefore, description will be made of the case where the switches $SW_1$ to $SW_5$ are switched to the contact $a$ side, namely the case where power is supplied to the load L. In this case, the upper limit switch circuit 6 becomes irrelative since the collector side of its succeeding transistor $Tr_2$ is separated. If a commercial power source is applied in this state, the voltage rectified by the rectifier circuit 5 is smoothed by the capacitor $C_3$ to impart a detecting potential to the capacitor $C_2$ by the variable resistor VR, whereby an optimum potential controlled by the emitter and collector of transistor $Tr_3$ is imparted to the load L. Also, an automatic stabilizing circuit is formed by the detecting circuit 9 and the control circuit 7, and therefore, if the time constant determined by the capacitor $C_2$ and the variable resistor VR is preselected at a high value, the variation in the load voltage with respect to a sharp variation in the commercial power source is extremely reduced to an advantage.

If the variable resistor VR is preadjusted such that the terminal voltage of the load L as it has the commercial power source applied thereto is somewhat higher than the terminal voltage applied to the load L from the battery B through the lower limit switch circuit 8, power is supplied to the load L from the commerical power source and not from the battery B. Also, since the emitter and collector of the transistor $Tr_6$ are in such directions as to prevent the flow of the charging current, power supply to the battery B never occurs simultaneously with that to the load.

On the other hand, in the lower limit voltage switch circuit 8, the capacitor $C_1$ is changed from its short circuited state to its open state by the switching of the switch $SW_5$ from the contact $b$ side to the contact $a$ side, and when the difference between the base potential $V_B$ and the emitter potential $V_E$ of transistor $Tr_4$ determined by the dividing resistors $R_8$ and $R_9$ is $$V_B - V_E > Vbe$$

the transistor $Tr_4$ and accordingly transistors $Tr_5$ and $Tr_6$ are already in the "ON" state. Therefore, if the potential becomes zero by the failure of the commercial power source or other reason, power is supplied to the load L from the battery B. When power is thus supplied to the load L from the battery B, the automatic stabilizing circuit comprising the detecting circuit 9 and control circuit 7 is not connected and thereby the potential of the battery B is imparted to the load L without being controlled. In the lower limit switch circuit 9, the dividing resistors $R_8$ and $R_9$ are predetermined such that the relation becomes $$V_B - V_E < Vbe$$

when the battery B reaches a set limit voltage at which it does not overdischarge. The resistors $B_{10}$ to $R_{13}$ are also predetermined such that when the transistor $Tr_4$ is in the "OFF" state the transistors $Tr_5$ and $Tr_6$ are equally in the "OFF" state. When the battery B drops to a lower level than the set potential of the transistor $Tr_4$, the transistor $Tr_4$ instantaneously assumes the "OFF" state followed by the switching to the "OFF" state of transistors $Tr_5$ and $Tr_6$, whereby the power supply from the battery B is cut off to prevent any overdischarge. Once the nonreturn type lower limit switch circuit 8 is switched off, the relation of $V_B - V_E < Vbe$ in the transistor $Tr_4$ is maintained to return the switches $SW_1$ to $SW_5$ to the $b$ side and no power is again supplied to the load insofar as these switches are thereafter connected with the $a$ side again.

In the circuit shown in FIG. 7, the operation during the charging of the battery B is similar to that in FIG. 1A. In this circuit the battery B is connected between the collector of transistor $Tr_3$ and the negative side of the rectifier circuit 5 through a reverse current preventing diode $D_{11}$, and the mechanism of operation is very much the same as that of FIG. 6.

Another form of application will be described with reference to the drawings. FIG. 8 shows a block diagram of a power source means, which is illustrated in greater detail in FIGS. 9 and 10. In FIG. 8, the numeral 5 indicates a rectifier circuit connected with a commercial power source, the numeral 6 represents an automatic return type upper limit voltage switch circuit and the numeral 7 denotes a control circuit. These circuits are quite the same as those shown in FIG. 5. The numeral 8 is an automatic return type lower limit voltage switch circuit, 9 is a detecting circuit and the letters B and L denote a secondary battery such as a storage battery and a load respectively. During the power supply to the load L, a parallel circuit comprising the rectifier circuit 5, the upper limit switch circuit 6 and the detecting circuit 9 is connected in parallel with a series circuit comprising the load L and the control circuit 7. During the charging of the storage battery B, a series circuit comprising the battery B and the control circuit 7 is connected in parallel with the rectifier circuit 5 and the upper limit switch circuit 6.

This arrangement is illustrated in further detail in FIG. 9, wherein the mechanism of operation and the construction of the circuits 5, 6, 7 and battery B and load L are similar to those of FIG. 6 arrangement. Therefore description will be made of the circuits 8 and 9. The automatic return type lower limit voltage switch circuit 8 comprises a modified Schmitt circuit formed by two transistors of opposite polarities such as an NPN transistor $Tr_4$ and a PNP transistor $Tr_5$ having their emitters connected together through a resistor $R_{11}$, in which the preceding transistor $Tr_4$ is connected with a connection point of the dividing resistors $R_8$ and $R_9$. The detecting circuit 9 comprises an NPN transistor $Tr_6$ having its base connected with the collector of the resistor $Tr_5$, a variable transistor VR connected with the emitter of said transistor $Tr_6$, a PNP transistor $Tr_7$ having its base connected with the negative side of the battery B through a resistor $R_{14}$ and its collector connected with the emitter of said transistor $Tr_6$, and a capacitor $C_1$. The numeral $C_3$ represents a smoothing capacitor. The detecting circuit 9 is connected in parallel with the rectifier circuit 5 through the contact $a$ of switch $SW_2$, and the detecting potential of the capacitor $C_1$ is imparted to the base of the control transistor $Tr_3$ through the contact $a$ of switch $SW_1$. The load L is connected in parallel with the rectifier circuit 5 through a contact $a$ of switch $SW_3$ and the emitter and collector of transistor $Tr_3$. $D_{11}$ and $D_{12}$ are reverse current preventing diodes. Switches $SW_1$ to $SW_3$ are associated in interlocking relationship with each other and they are switched to either the contact $a$ side or the contact $b$ side in unison.

In operation, when the switches $SW_1$ to $SW_3$ are connected to their contact $b$ side, the circuit to the load L is disconnected by the switch $SW_3$ to thereby form a circuit for charging the battery B. The circuit formation in this case, as has already been described with respect to FIG. 6, performs the operation of the automatic charging circuit as shown in FIG. 1B, and therefore description of the operation of this charging circuit is omitted here and explanation will be given below about the case where the switches $SW_1$ to $SW_3$ are connected to the contact $a$ side to supply power to the load L. In this latter case the upper limit switch circuit becomes irrelevant since the collector side of the succeeding transistor $Tr_2$ is separated. When a commercial power source is applied in such state, the voltage rectified by the rectifier circuit 5 is imparted to the smoothing capacitor $C_3$ and the automatic return type lower limit switch circuit 8.

If the lower limit switch circuit 8 has its dividing resistors $R_8$ and $R_9$ set at such limit voltage that the battery B is not overdischarged, when the battery B reaches such set potential, the difference between the base potential $V_B$ and emitter potential $V_E$ of transistor $Tr_4$ becomes $$V_B - V_E < Vbe$$

whereby the transistor $Tr_4$ and consequently transistors $Tr_3$ and $Tr_6$ assume the "OFF" state and further the transistor $Tr_3$ also assumes the "OFF" state. $Vbe$ is the voltage at which the transistor $Tr_4$ operates, and resistors $R_{10}$ to $R_{13}$ are predetermined such that when the transistor $Tr_4$ is in the "OFF" state the transistors $Tr_5$ and $Tr_6$ are also in the "OFF" state.

Now, if the potential of the battery B is sufficiently higher than the above described potential, the difference between the base potential $V_B$ and the emitter potential $V_E$ of the transistor $Tr_4$ is in the relation of $V_B - V_E > Vbe$, whereby the transistor $Tr_4$ as well as transistors $Tr_5$ and $Tr_6$ is in the "ON" state and the transistor $Tr_3$ is also in the "ON" state.

In the detecting circuit 9, on the other hand, the transistor $Tr_6$ is in the "ON" state and therefore the variable resistor VR, transistor $Tr_6$ and capacitor $C_1$ provide an automatic stabilizing detector circuit and the potential of the capacitor $C_1$ adjusted by the variable resistor VR is imparted to the base of the transistor $Tr_3$. To the load L power is supplied through said variable resistor VR, transistor $Tr_6$, capacitor $C_1$ and transistor $Tr_3$ in the order of the positive side of the rectifier circuit 5, the load L, the emitter and collector of the transistor $Tr_3$ and the negative side of the rectifier circuit 5.

Here, if the potential from the commercial power source rectified and smoothed is selected at a higher level than the potential of the battery B, no power supply from the battery B to the load L is effected during the application of the commercial power source. No charging current is either passed to the battery B since the diode $D_{11}$ is connected with the battey B in the opposite direction to that in which the charging current is passed.

A transsitor $Tr_7$ has its base connected with the negative side of the battery B through a resistor $R_{14}$, and also has its emitter and collector connected with the negative side of the rectifier circuit 5 and the emitter of the transistor $Tr_6$ respectively. Therefore, in such a state that a current passes from the battery B to the diode $D_{11}$, the relation between the base potential $V_B$ and emitter potential $V_E$ of the transistor $Tr_7$ becomes $V_B - V_E > 0$ and the transistor $Tr_7$ is in the "OFF" state between its emitter and collector. Consequently, the variable resistor VR is not short-circuited by the emitter and collector of the transistor $Tr_7$ during the application of the commercial power source, with a result that the voltage adjusted by the variable resistor VR is applied to the load. If in such state the time constant determined by the product of the variable resistor VR and the capacitor $C_1$ is selected at a substantially high value, the variation in the load voltage with respect to the sharp variation in the commercial power source is extremely reduced.

Figure 12:
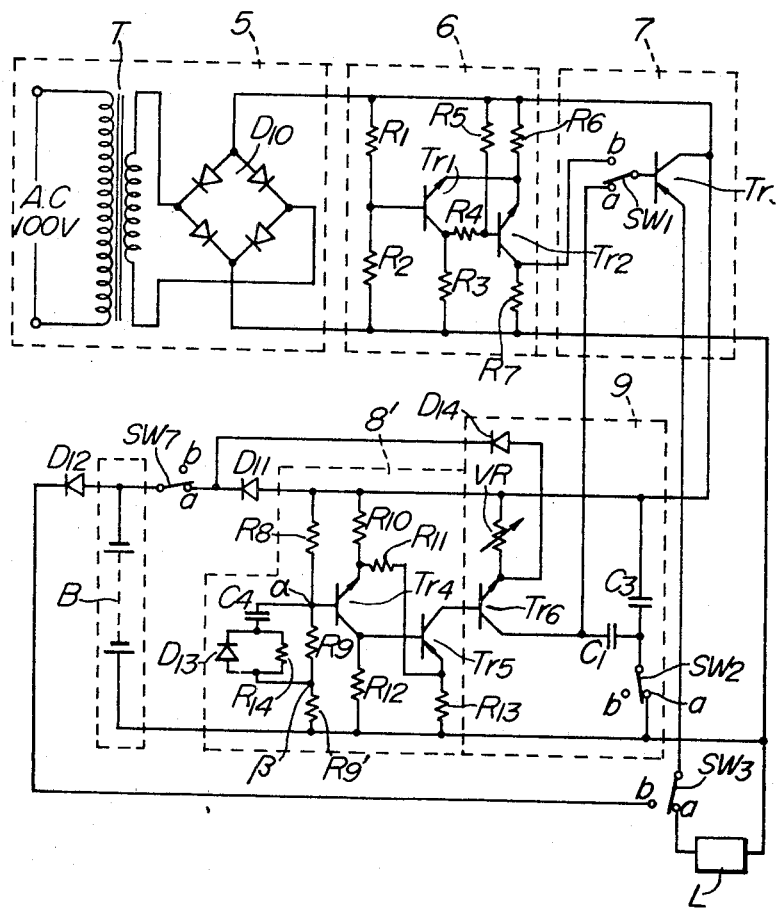
FIG. 12 shows an electric circuit in the transistor controlled battery charger illustrated in FIG. 11.
Figure 13:
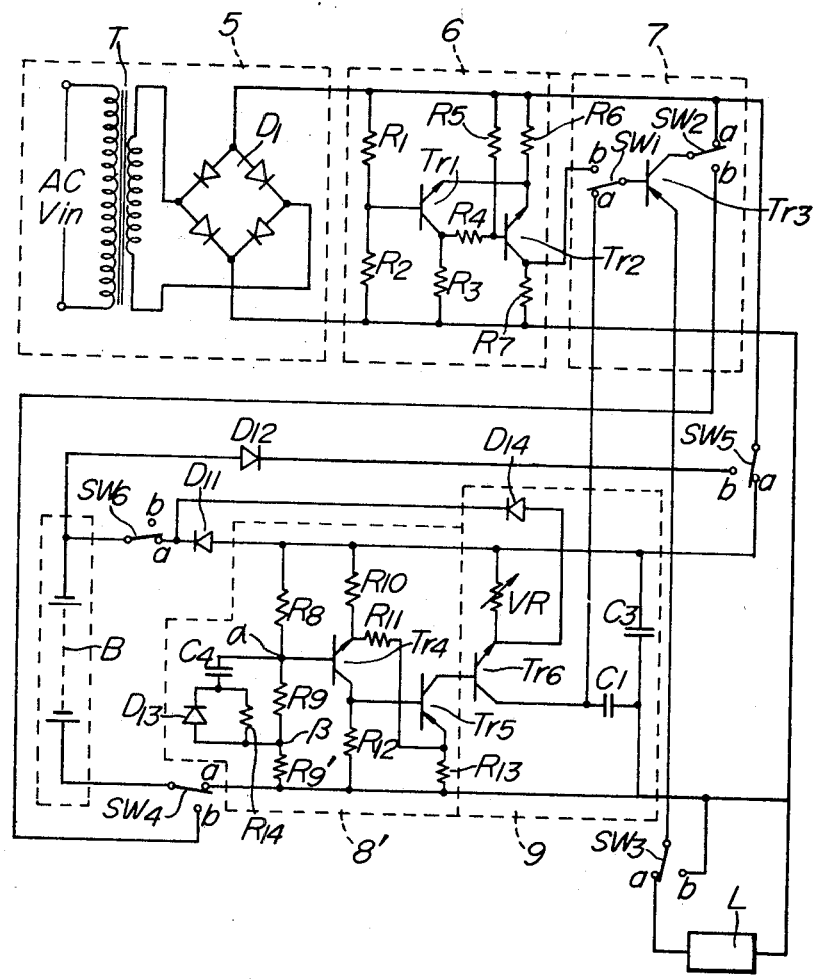
FIG. 13 is a modified electric circuit of FIG. 12.

Alternatively, a diode $D_{14}$ as shown in FIGS. 12 and 13 may be used instead of the transistor $Tr_7$. In this alternative case, when no current passes through the diode $D_{11}$, the diode $D_{14}$ is biased at the reverse potential, whereby the current is passed through the variable resistor VR without passing into the emitter of the transistor $Tr_6$ through the diode $D_{14}$. Thus, a voltage adjusted by said variable resistor VR is applied to the load L. If a current passes through the diode $D_{11}$, a forward potential is applied to the diode $D_{14}$, whereby the variable resistor is short-circuited by the diode $D_{14}$ and thus the voltage applied to the load L is never limited by the variable resistor VR.

At this time, if the potential becomes zero by the failure of the commercial power supply or other reason, power is supplied to the load L from the battery B through the automatic return type lower limit switch circuit 8, diode $D_{11}$ and transistor $Tr_3$.

If a current passes through the diode $D_{11}$, a resultant forward voltage drop thereacross is applied to the transistor $Tr_7$ through the resistor $R_{14}$ in such a state that $V_B - V_E < 0$, thus rendering the transistor $Tr_7$ conductive. In this way the variable resistor VR is practically short-circuited by the emitter and collector of the transistor $Tr_7$.

Consequently, the power supply from the secondary battery B to the load L can be effected without being restricted by the variable resistor VR.

When the power is continuedly supplied from the battery B to the load L in this manner until the potential of the battery B reaches the set potential of said transistor $Tr_4$, the transistor $Tr_4$ and transistors $Tr_5$ and $Tr_6$ become nonconductive and consequently the transistor $Tr_3$ also becomes nonconductive, thereby breaking the power supply to the load L. Since the lower limit switch circuit 8 is of the automatic return type, when the power supply is cut off, the storage battery B recovers to again render the transsitors $Tr_4$, $Tr_5$, $Tr_6$ and $Tr_3$ into the conductive state so as to effect the power supply. In this way the power supply is effected in such an intermittent manner as to be cut off each time the battery B reaches the set potential, and therefore the interlocking switches must be connected on their $b$ side to disconnect the load L. However, even if the battery B is left in such intermittent power supply condition, the average power supply is extremely reduced, and if the open terminal voltage of the battery B drops to below the set potential of the transistor $Tr_4$, the power supply to the load L becomes null and thereby any overdischarge of the battery B can be prevented.

In the arrangement shown in FIG. 10, the connections during the charging of the battery B are made similar to those in FIG. 1A, and in other respects this arrangement operates in much the same way as the arrangement of FIG. 9.

As is apparent from the above description, the power source means provided with the transistor controlled battery charger as shown in FIGS. 5 to 7 according to the present invention comprises a rectifier circuit connected with a commercial power source, an automatic return type upper limit voltage switch circuit connected in parallel with said rectifier circuit, a capacitor and a nonreturn type lower limit voltage switch circuit connected in parallel therewith, a load, and a switch mechanism adapted, during power supply to said load, to connect said two sets of parallel circuits in parallel with each other through a control circuit of which the input is the detecting potential of said capacitor in the detecting circuit, and adapted, during charging of the secondary battery, to connect the series circuit consisting of the secondary battery and the control circuit in parallel with said rectifier circuit and said upper limit voltage switch circuit.

The power source means provided with the transistor controlled battery charger as shown in FIGS. 8 to 10 comprises a rectifier circuit connected with a commercial power source, an automatic return type upper limit voltage switch circuit and a detecting circuit connected in parallel with said rectifier circuit, a battery and an automatic return type lower limit voltage switch circuit connected in parallel therewith through a diode connected in opposite polarity to said battery, a load and a control circuit connected in series therewith, and a switch mechanism adapted, during power supply to the load, to connect all said circuits in parallel with each other and adapted, during charging of said secondary battery, to connect the series circuit consisting of said control circuit and secondary battery in parallel with said rectifier circuit and upper limit voltage switch circuit.

Accordingly, in any of these power source means, power supply can be effected automatically by the storage battery even if the commercial power source is stopped by failure or other reason during the power supply to the load, and the battery can be charged when the load is disconnected. Moreover, there is no possibility that the storage battery is either overdischarged or overcharged, and the surge absorbing characteristic is provided when power is supplied from the commercial power source to the load.

Figure 11:
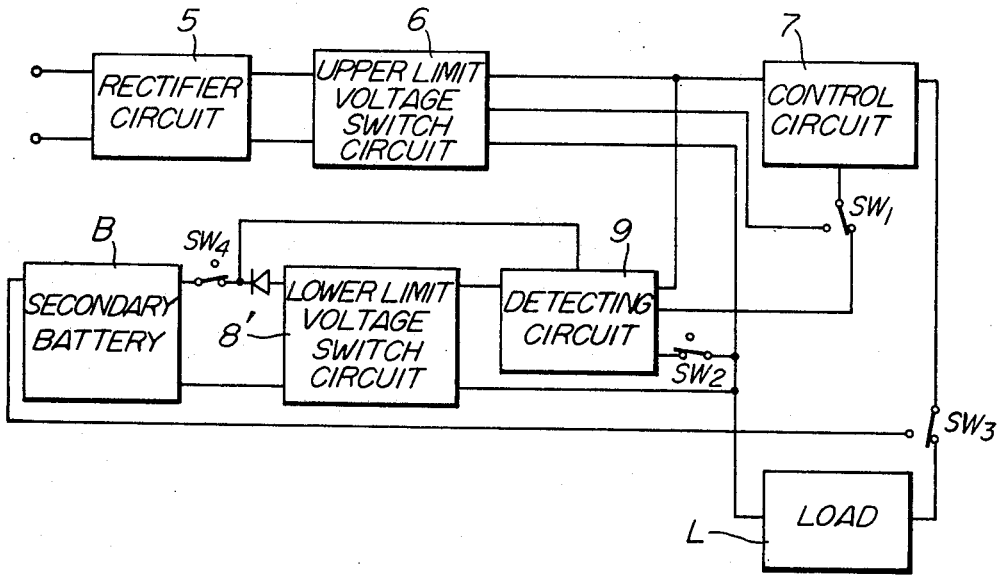
FIG. 11 is a modified block diagram of the electric circuit in the transistor controlled battery charger as illustrated in FIG. 9.

The electrical circuits as shown in FIGS. 11 to 13 are modified forms of the FIG. 9 circuit, one of which will be described with respect to FIG. 12.

In this circuit, instead of the automatic return type lower limit voltage switch circuit 8, use is made of an automatic return type lower limit voltage switch circuit 8' provided with a starting circuit, which comprises a transistor $Tr_4$ having its base connected with the connection point between dividing resistors $R_8$ and $R_9$, one of said resistors $R_8$ and $R_9$, namely resistor $R_9$ being divided into two resistors $R_9$ and $R_{9'}$, a starting diode $D_{13}$ and a resistor $R_{14}$ connected in parallel with the opposite ends of said resistor $R_9$ respectively, and a starting capacitor $C_4$ connected in series with said resistor $R_9$, said parallel connection and said series connection being connected in parallel to each other. $SW_7$ is an interlocking switch connected between the secondary battery B and said automatic return type lower limit voltage switch circuit 8' provided with the starting circuit, and use is made of a diode $D_{14}$ instead of transistor $Tr_7$. The arrangement of the circuit is the same as that shown in FIG. 9 except the above.

In the case where such circuit 8' is provided, the operating voltage of the transistor $Tr_4$ is set above the maximum voltage of the battery B at the completion of charging, and the cut-off voltage is made to serve as the overdischarge preventing voltage for the battery B. At the same time, the ratio of the time-constants possessed by the resistors $R_8$, $R_9$ and $R_{9'}$, namely the ratio of $$T_1 = C_4 \times (R_8 + R_9)'$$

and $T_2 = C_4 \times (R_9 + R_{14})$ is selected in the vicinity of $T_2/T_1 \doteq 100$, after power is supplied from the battery B to the load L and the battery voltage becomes the overdischarge preventing voltage, no power is again supplied to the load L even if the voltage of the battery B is recovered so that any overdischarge of the battery B may be prevented. If the power supply from the commercial power source to the load L is cut off, power is automatically supplied from the battery B to the load L.

Figure 14:
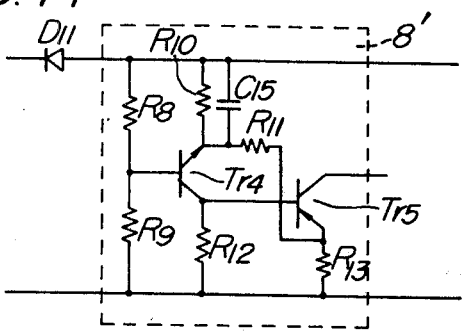
FIGS. 14, 15 and 16 are circuit diagrams in which the major part of the transistor controlled battery charger shown in FIG. 9 is modified.
Figure 15:
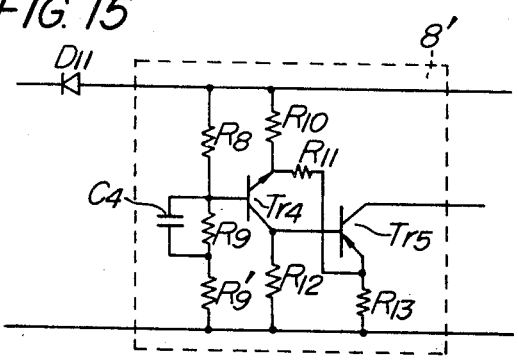
Figure 16:
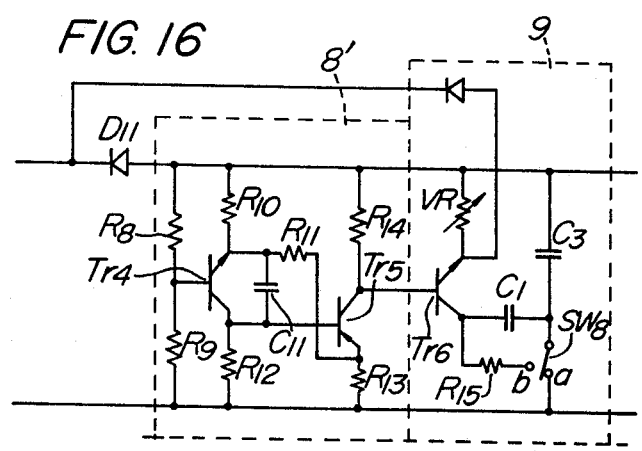

As shown in FIG. 14, the automatic return type lower limit voltage switch circuit 8' provided with the starting circuit may also be formed either by connecting a resistor $R_{10}$ and a capacitor $C_{15}$ in parallel with each other, or by connecting the base of transistor $Tr_4$ with the connection point of resistors $R_8$ and $R_9$, dividing one of these resistors, namely resistor $R_9$ into two resistors $R_9$ and $R_{9'}$, and connecting a capacitor $C_4$, in parallel with said resistor $R_9$. Or alternatively, as shown in FIG. 16, it is possible to connect a capacitor $C_{11}$ between the emitter and collector of transistor $Tr_4$ so as to discharge the electric charge of the capacitor $C_1$ in the detecting circuit 9 through a discharging resistor $R_{15}$ when the contact of switch $SW_8$ is moved to the b side. Further, when the capacity of the capacitor $C_{11}$ is 1 $\mu$F., the value of the resistor $R_{15}$ may be set in the range of several tens to several hundred percent. When such circuit is used, the battery B is free from overdischage and can supply power to the load L if the commercial power source is cut off.

As has been described above, the use of the transistor controlled battery charging circuit according to the present invention enables additional charging to be repeatedly and efficiently effected in a form of joggling without any gas being generated from the secondary battery.

What is claimed is:

1. A transistor controlled battery charger comprising a jumping switch circuit formed of two transistors, a rectifier circuit having its output and input terminals connected with resistors, the base of the preceding transistor of said jumping switch circuit being connected with the connection point of said resistors so as to form an upper limit voltage switch circuit, a detecting circuit consisting of a capacitor and a variable resistor and connected with the output terminal of said upper limit voltage switch circuit, a parallel circuit of a secondary battery and a lower limit voltage switch circuit, said parallel circuit being connected with a load to form a circuit, and a switch mechanism adapted, during power supply to said load, to connect said two latter circuits in parallel through a control circuit having a transistor of which the input is the detecting potential from the capacitor of said detecting circuit, and adapted, during charging of said secondary battery, to connect a series circuit of said secondary battery and said control circuit in parallel with said rectifier circuit and said upper limit voltage switch circuit.

2. A transistor controlled battery charger comprising a jumping switch circuit formed of two transistors having their emitters connected together, a rectifier circuit having its output and input terminals connected with resistors, the base of the preceding transistor of said jumping switch circuit being connected with the connection point of said resistors to form an automatic upper limit voltage switch circuit, a detecting circuit consisting of a capacitor and a variable resistor and connected with the output terminal of said automatic upper limit voltage switch circuit, a nonreturn type lower limit voltage switch circuit formed mainly of a modified Schmitt circuit and connected in parallel with a secondary battery, and a switch mechanism adapted, during power supply to a load, to connect said two latter circuits in parallel through a control circuit having a transistor connected in series with the load, and adapted, during charging of the secondary battery, to connect a series circuit of said control circuit and secondary battery in parallel with said rectifier circuit and said upper limit voltage switch circuit.

3. A transistor controlled battery charger comprising a jumping switch circuit formed of two transistors having their emitters connected together, a rectifier circuit having its output and input terminals connected with resistors, the base of the preceding transistor of said Schmitt circuit being connected with the connection point of said resistors to form an automatic upper limit voltage switch circuit, a detecting circuit consisting of a capacitor and a variable resistor and connected with the output terminal of said automatic upper limit voltage switch conduit, an automatic lower limit voltage circuit formed mainly of a modified jumping switch circuit and connected in parallel with a secondary battery through a diode connected in opposite polarity to the latter and a switch mechanism adapted, during power supply to a load, to connect said two latter circuits in parallel with each other through a control circuit having a transistor connected in series with the load, and adapted, during charging of the secondary battery, to connect a series circuit of said control circuit and secondary battery in parallel with said rectifier circuit and said automatic upper limit voltage switch circuit.

4. A transistor controlled battery charger comprising a jumping switch circuit formed of two transistors having their emitters connected together, a rectifier circuit having its output and input terminals connected with resistors, the base of the preceding transistor of said jumping switch circuit being connected with the connection point of said resistors to form an upper limit voltage switch circuit, a detecting circuit consisting of a capacitor and a variable resistor and connected with the output terminal of said upper limit voltage switch circuit, an automatic return type lower limit voltage switch circuit provided with a starting circuit and connected in parallel with a secondary battery, and a switch mechanism adapted, during power supply to a load, to connect and said two latter circuits in parallel with each other through a control circuit having a transistor connected in series with the load, and adapted, during charging of the secondary battery, to connect a series circuit of said control circuit and secondary battery in parallel with said rectifier circuit and said upper limit voltage switch circuit.

5. A transistor controlled battery charged comprising a jumping switch circuit formed of two transistors having their emitters connected together, a rectifier circuit having its output and input terminals connected with resistors, the base of the preceding transistor of said jumping switch circuit being connected with the connection point of said resistors to form an upper limit voltage switch circuit, a detecting circuit consisting of a capacitor and a variable resistor and connected with the output terminal of said upper limit voltage switch circuit, a parallel circuit consisting of one of dividing resistors and a rectifier and connected in series with said capacitor, said parallel circuit being connected in parallel with a secondary battery through a diode connected in opposite polarity to the latter, an automatic return type lower limit voltage switch circuit provided with a starting circuit and formed mainly of a modifiel jumping switch circuit, in which the base of the preceding transistor is connected with the connection point of said dividing resistors, and a switch mechanism adapted, durnig power supply to a load, to connect said two latter circuits in parallel with each other through a control circuit having a transistor connected in series with the load, and adapted, during charging of the secondary battery, to connect a series circuit of said control circuit and secondary battery in parallel with said rectifier circuit and said upper limit voltage switch circuit.

6. A transistor controlled battery charger comprising a jumping switch circuit formed of two transistors having their emitters connected together, a rectifier circuit having its output and input terminals connected with resistors, the base of the preceding transistor of said Schmitt circuit being connected with the connection point of said resistors to form an upper limit voltage switch circuit, a detecting circuit consisting of a capacitor and a variable resistor and connected with the output terminal of said upper limit voltage switch circuit, an automatic return type lower limit voltage switch circuit provided with a starting circuit and formed mainly of a modified jumping switch circuit in which a capacitor is connected in parallel with the emitter resistor of the preceding transistor having its base connected with the connection point of dividing resistors, said automatic return type lower limit voltage switch circuit being connected with a secondary battery through a diode connected in opposite polarity to the latter, and a switch mechanism adapted, during power supply to a load, to connect said two latter circuits in parallel with each other through a control circuit having a transistor connected in series with the load, and adapted, during charging of the secondary battery, to connect a series circuit of said control circuit and secondary battery in parallel with said rectifier circuit and said upper limit voltage switch circuit.

7. A transistor controlled battery charger comprising a jumping switch circuit formed of two transistors having their emitters connected together, a rectifier circuit having its output and input terminals connected with resistors, the base of the preceding transistor of said Schmitt circuit being connected with the connection point of said resistors to form an upper limit voltage switch circuit, a detecting circuit consisting of a capacitor and a variable resistor and connected with the output terminal of said upper limit voltage switch circuit, an automatic return type lower limit switch circuit provided with a starting circuit and formed mainly of a modified jumping switch circuit in which a capacitor is connected in parallel with one of dividing resistors and the base of the preceding transistor is connected with the connection point of said dividing resistors, said automatic return type lower limit switch circuit being connected with a secondary battery through diodes connected in opposite polarity, and a switch mechanism adapted, during power supply to a load, to connect said two latter circuits in parallel with each other through a control circuit having a transistor connected in series with the load, and adapted, during charging of the secondary battery, to connect a series circuit of said secondary battery and control circuit in parallel with said rectifier circuit and said upper limit voltage switch circuit.

8. A transistor controlled battery charger comprising a jumping switch circuit formed of two transistors having their emitters connected together, a rectifier circuit having its output and input terminals connected with resistors, the base of the preceding transistor of said Schmitt circuit being connected with the connection point of said resistors to form an upper limit voltage switch circuit, a detecting circuit consisting of a capacitor and a variable resistor and connected with the output terminal of said upper limit voltage switch, an automatic return type lower limit voltage switch circuit provided with a starting circuit and formed mainly of a modified jumping switch circuit in which a capacitor is connected between the emitter and collector of the preceding transistor, said automatic return type lower limit voltage switch circuit being through diodes connected in opposite polarity to the latter, and a switch mechanism adapted, during power supply to a load, to connect said two latter circuits in parallel with each other through a control circuit having a transistor connected in series with the load, and adapted, during charging of said secondary battery, to connect a series circuit of said control circuit and secondary battery in parallel with said rectifier circuit and said upper limit voltage switch circuit.

9. A transistor controlled battery charger comprising: a rectifier circuit producing a pulsated current power; first and second resistors connected in series across output terminals of said rectifier circuit; a jumping switch circuit including a first transistor the base of which a connected intermediate said first and second resistors; and a second transistor the emitter of which is connected directly to the emitter of said first transistor, said directly connected emitters being further connected through a third resistor to one of said output terminals, the collector of said first transistor being connected through a fourth resistor to the other of said output terminals and through a fifth resistor to the base of said second transistor, the collector of said second transistor being connected through a sixth resistor to said other terminal of the rectifier circuit; a secondary battery; and a control of transistor connected with one pole of said secondary battery at one of its emitter and collector electrodes, the remaining electrode being connected to one of said output terminals, the base of the control transistor being connected directly to the collector of said second transistor; said jumping switch circuit being turned on or off in response to potential increases of said pulsated current power, at a potential value change rate which is predetermined between resistances of said series resistors connected to said first transistor in relation to said secondary battery, thereby providing on and off regions in the control transistor for a period of time during which said pulsated voltage rises, so that when a charged potential of the secondary battery exceeds the predetermined off potential the control transistor is turned to the off region to cut off charging current, while when said charged potential falls below said off potential the control transistor is turned to the on region due to rise of the pulsated potential to conduct the charging current into the battery, and when at the end of the charging said charged potential exceeds said off potential to interrupt the charging current to the battery, the control transistor operates to intermittently charge the battery at a time interval which is arbitrarily determined in relation to the rate of the potential drop of the battery.

References Cited

UNITED STATES PATENTS

| | | | |
|---|---|---|---|
| 3,179,871 | 4/1965 | Bagno | 320—30 |
| 3,356,922 | 12/1967 | Johnston | 320—40 X |
| 3,387,141 | 6/1968 | Howald | 307—66 X |
| 3,389,325 | 6/1968 | Gilbert | 320—31 |
| 3,409,802 | 11/1968 | Savage | 320—40 X |

JAMES D. TRAMMELL, Primary Examiner

J. M. GUNTHER, Assistant Examiner

U.S. Cl. X.R.

320—21, 23, 31